US009580117B1

(12) United States Patent
Krstovic

(10) Patent No.: US 9,580,117 B1
(45) Date of Patent: Feb. 28, 2017

(54) DRAG-REDUCING APPARATUS FOR CARGO CONTAINERS

(71) Applicant: Alexander Krstovic, Easley, SC (US)

(72) Inventor: Alexander Krstovic, Easley, SC (US)

( * ) Notice: Subject to any disclaimer, the term of this patent is extended or adjusted under 35 U.S.C. 154(b) by 0 days.

(21) Appl. No.: 15/003,084

(22) Filed: Jan. 21, 2016

(51) Int. Cl.
*B62D 35/00* (2006.01)

(52) U.S. Cl.
CPC .................. *B62D 35/001* (2013.01)

(58) Field of Classification Search
CPC .... B62D 35/004; B62D 35/001; B62D 63/08; B64D 39/00; B64D 17/00; B64D 39/04
USPC .......... 296/180.4, 108.5, 181, 5, 91; 701/79; 422/382, 383, 394, 395, 398
See application file for complete search history.

(56) References Cited

U.S. PATENT DOCUMENTS

| | | | |
|---|---|---|---|
| 2,737,411 A | 3/1956 | Potter | |
| 2,998,949 A | 9/1961 | Patterson | |
| 4,142,755 A | 3/1979 | Keedy | |
| 4,236,745 A | 12/1980 | Davis | |
| 4,601,508 A | 7/1986 | Kerian | |
| 4,688,841 A | 8/1987 | Moore | |
| 4,702,509 A | 10/1987 | Elliott, Sr | |
| 4,927,099 A | 5/1990 | Emerson et al. | |
| 4,978,162 A | 12/1990 | Labbe | |
| 5,058,945 A | 10/1991 | Elliott, Sr. et al. | |
| 5,348,366 A * | 9/1994 | Baker | B62D 35/001 296/180.4 |
| 5,375,903 A * | 12/1994 | Lechner | B62D 35/001 296/180.1 |
| 6,409,252 B1 | 6/2002 | Andrus | |
| 6,467,833 B1 | 10/2002 | Travers | |
| 6,742,616 B2 * | 6/2004 | Leban | B62D 35/004 180/116 |
| 6,932,419 B1 | 8/2005 | McCullough | |
| 7,243,980 B2 | 7/2007 | Vala | |
| 7,726,724 B2 * | 6/2010 | Kohls | B62D 35/001 296/180.1 |
| 7,740,304 B1 | 6/2010 | Breu | |
| 8,007,030 B2 | 8/2011 | Wood | |
| 8,100,461 B2 | 1/2012 | Smith et al. | |
| 8,579,360 B2 * | 11/2013 | Litchfield | G06F 12/0246 296/180.1 |
| 2007/0046066 A1 | 3/2007 | Cosgrove et al. | |
| 2008/0116716 A1 * | 5/2008 | O'Grady | B62D 35/001 296/180.4 |

(Continued)

FOREIGN PATENT DOCUMENTS

DE    3115742    11/1982

*Primary Examiner* — Glenn Dayoan
*Assistant Examiner* — Sunsurraye Westbrook
(74) *Attorney, Agent, or Firm* — Smith Moore Leatherwood LLP; Thomas W. Epting

(57) ABSTRACT

In one aspect, drag-reducing apparatus for cargo containers are described herein. Cargo containers usable with such apparatus can have a top surface, a first side surface having a first rear door attached thereto by at least one first hinge, and a second side surface having a second rear door attached thereto by at least one second hinge. In some embodiments, drag-reducing apparatus comprise a first flexible airfoil, a plurality of first fasteners, a second flexible airfoil, and a plurality of second fasteners. In some other embodiments, an apparatus described herein comprises a first vertical guide member, a second vertical guide member, a flexible airfoil, and a plurality of fasteners.

19 Claims, 15 Drawing Sheets

(56) References Cited

U.S. PATENT DOCUMENTS

2010/0231001 A1 9/2010 Mracek
2011/0037291 A1 2/2011 Pickering
2011/0068603 A1 3/2011 Domo et al.

* cited by examiner

DRAG-REDUCING APPARATUS FOR CARGO CONTAINERS

FIELD

The present disclosure relates to drag-reducing apparatus for use with cargo containers and, in particular, for cargo containers attached to or part of a commercial transport vehicle.

BACKGROUND

Commercial transport vehicles such as tractor-trailers are frequently used for long-distance cost-efficient transport of cargo. However, space-efficient designs of such vehicles often pose problems relating to aerodynamic efficiency that can result in decreased fuel efficiency. Specifically, cargo containers designed for use with commercial transport vehicles are generally rectangular in shape, and a rear end or rear portion of a cargo container can provide sub-optimal air flow around the transport vehicle. The square or rectangular shape of a rear portion of a cargo container often results in vortices that generate drag. In many cases, the drag generated by the cargo container's shape is on the order of hundreds of pounds at highway speed. While efforts have been made to produce attachments for these cargo containers to minimize drag, such attachments come with drawbacks of their own. For example, prior attachments/apparatus are difficult to deploy or are difficult to open or close in a manner permitting loading/unloading of the cargo container. Therefore, there is a need for improved attachments or apparatus to reduce drag imposed on a cargo container, particularly a cargo container in use with a commercial transport vehicle.

SUMMARY

In one aspect, drag-reducing apparatus for cargo containers are described herein. Cargo containers usable with such apparatus can have a top surface, a first side surface having a first rear door attached thereto by at least one first hinge, and a second side surface having a second rear door attached thereto by at least one second hinge. In some embodiments, drag-reducing apparatus comprise a first flexible airfoil, a plurality of first fasteners, a second flexible airfoil, and a plurality of second fasteners. The first flexible airfoil defines a first edge, and the second flexible airfoil defines a second edge. The plurality of first fasteners are adapted to join the first edge of the first flexible airfoil to the first side surface of the cargo container adjacent the first hinge to define a first air inlet between the first flexible airfoil and the first side surface. Similarly, the plurality of second fasteners are adapted to join the second edge of the second flexible airfoil to the second side surface adjacent the second hinge to define a second air inlet between the second flexible airfoil and the second side surface. The first air inlet permits air flow along the first side surface into the first flexible airfoil to inflate the first flexible airfoil into a first deployed position when the cargo container is moved in a direction away from the first flexible airfoil. Additionally, the second air inlet permits air flow along the second side surface into the second flexible airfoil to inflate the second airfoil into a second deployed position when the cargo container is moved in a direction away from the second flexible airfoil.

In another aspect, drag-reducing apparatus are described herein for a cargo container defining a top surface, a rear surface, a first side surface having an intersection with the rear surface, and a second side surface having an intersection with the rear surface. The apparatus comprises a first vertical guide member, a second vertical guide member, a flexible airfoil, and a plurality of fasteners. The first vertical guide member is joined to the cargo container adjacent an intersection between the first side surface and the rear surface. The second vertical guide member is joined to the cargo container adjacent an intersection between the second side surface and the rear surface. The flexible airfoil defines a top edge, a first side edge, and a second side edge. The plurality of fasteners slidably join the first side edge of the flexible airfoil to the first vertical guide member and the second side edge of the flexible airfoil to the second vertical guide member. The flexible airfoil, the first side surface, and the fasteners together define a first air inlet between the side surface of the cargo container and the first side edge of the flexible airfoil. The flexible airfoil, the second side surface, and the fasteners together define a second air inlet between the second side surface of the cargo container and the second side edge of the flexible airfoil. At least one of the first air inlet and the second air inlet permits air flow along the first side surface and/or second side surface, respectively, into the flexible airfoil to inflate the flexible airfoil into a deployed position when the cargo container is moved in a direction away from the rear surface.

These and other implementations are described in more detail in the detailed description which follows.

DETAILED DESCRIPTION

Figure 1:
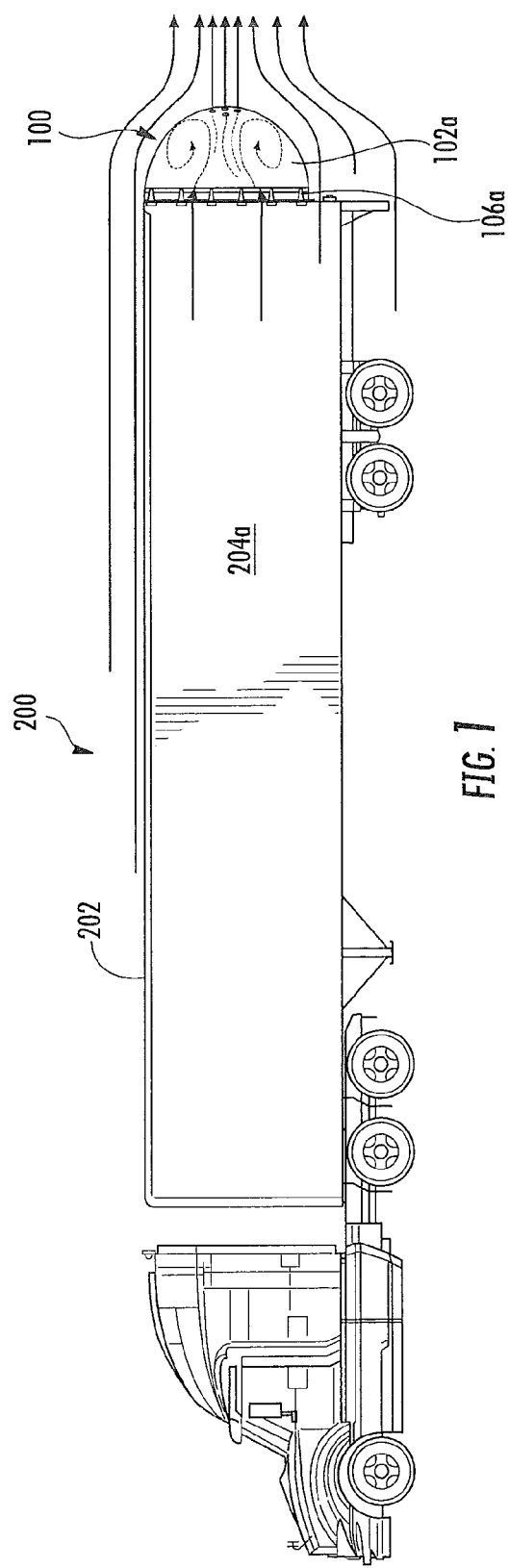
FIG. 1 illustrates a side view of a drag-reducing apparatus according to one embodiment described herein in use with a cargo container on a commercial transport vehicle.
Figure 2:
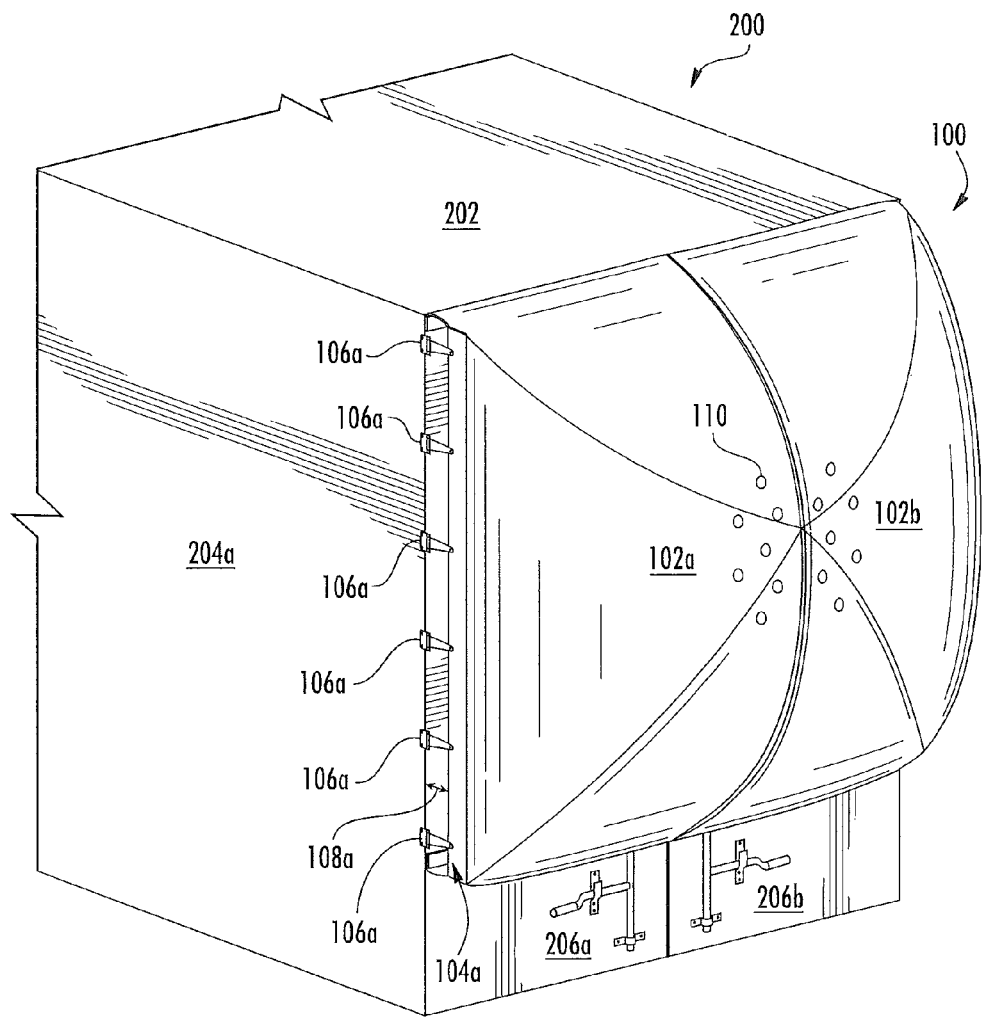
FIG. 2 illustrates a perspective drag-reducing apparatus according to one embodiment described herein in use with a cargo container.

Implementations described herein can be understood more readily by reference to the following detailed description, examples, and drawings. Elements, apparatus, and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points of 5 and 10.

I. Drag-Reducing Apparatus for Cargo Containers Having Two Rear Doors

In one aspect, drag-reducing apparatus are described herein for cargo containers having a first rear door and a second rear door. As illustrated in FIGS. 1-9B, the cargo container (200) defines a top surface (202), a first side surface (204a) having a first rear door (206a) attached thereto by at least one first hinge (208a), and a second side surface (204b) having a second rear door (206b) attached thereto by at least one second hinge (208b). The drag-reducing apparatus (100), in some embodiments, comprises a first flexible airfoil (102a), a plurality of first fasteners (106a), a second flexible airfoil (102b), and a plurality of second fasteners (106b). The first flexible airfoil (102a) defines a first edge (104a) and the second flexible airfoil (102b) defines a second edge (104b). The plurality of first fasteners (106a) are adapted to join the first edge (104a) of the first flexible airfoil (102a) to the first side surface (204a) adjacent the first hinge (208a) to define a first air inlet (108a) between the first flexible airfoil (102a) and the first side surface (204a). The plurality of second fasteners are adapted to join the second edge (104b) of the second flexible airfoil (102b) to the second side surface (204b) adjacent the second hinge (208b) to define a second air inlet (108b) between the second flexible airfoil (102b) and the second side surface (204b). The first air inlet (108a) permits air flow along the first side surface (204a) into the first flexible airfoil (102a) to inflate the first flexible airfoil (102a) into a first deployed position when the cargo container (200) is moved in a direction away from the first flexible airfoil (102a). Similarly, the second air inlet (108b) permits air flow along the second side surface (204b) into the second flexible airfoil (102b) to inflate the second airfoil (102b) into a second deployed position when the cargo container (200) is moved in a direction away from the second flexible airfoil (102b).

Turning now to specific components, drag-reducing apparatus consistent with a first aspect comprise a first flexible airfoil (102a) defining a first side edge (104a) and a second flexible airfoil (102b) defining a second side edge (104b). Flexible airfoils can comprise or be formed from any flexible material not inconsistent with the present invention. For example, a flexible airfoil can comprise or be formed from a natural or synthetic textile. Non-limiting examples of natural textiles that may be used include cotton, flax, bamboo, hemp, and/or silk. Non-limiting examples of synthetic fibers that may be used include rayon, acetate, polyester, aramid, acrylic, ingeo, lurex, lyocell, nylon, spandex, olefin and/or PLA fiber. Non-textile materials may also be used. However, in many embodiments consistent with the present invention, it may be desired that the flexible airfoil comprise or be formed from a material that may be inflated or filled with air when the cargo container is in motion in order to provide a rigid or semi-rigid airfoil shape. In certain embodiments, it may also be desired that such material is sufficiently flexible that it deflates or shifts into an un-deployed, de-deployed or non-rigid state to permit operation of the doors on the rear surface of the cargo container when the flexible airfoil is not in use for reduction in drag. Further discussion of deployed positions is provided herein below.

Figure 6:
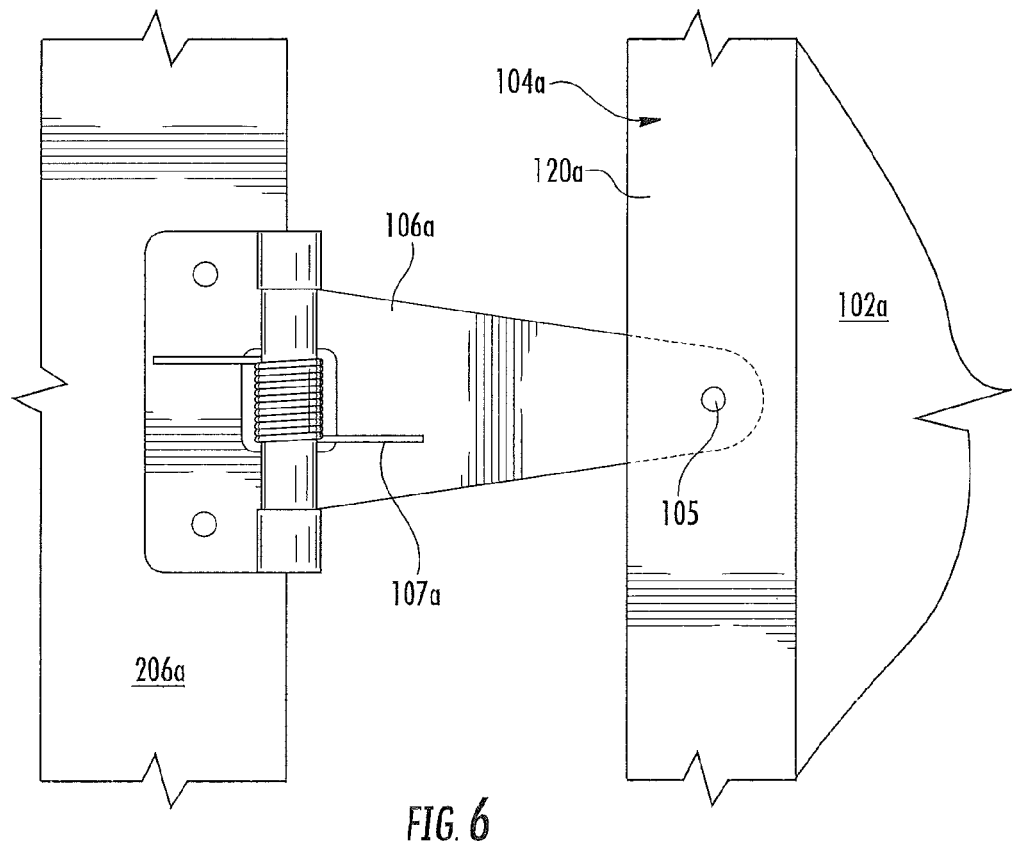
FIG. 6 illustrates a sectional view of components of a drag-reducing apparatus according to one embodiment described herein.

As described above, a first flexible airfoil (102a) defines a first side edge (104a) and a second flexible airfoil (102b) defines a second side edge (104b) as illustrated in greater detail in FIG. 6. In some embodiments, a first side edge and/or a second side edge can comprise or consist of only the material which forms the first flexible airfoil and/or second flexible airfoil. In certain other embodiments, as in FIG. 6, the first side edge and/or second side edge can comprise or include a rigid material connected or attached to the flexible airfoil. For example, in FIG. 6, a metallic edge member (120a) is joined to the flexible airfoil by pins, clasps or bolts (105). Such a configuration provides edge rigidity, structure, and provides a more stable attachment point for one or more fasteners (106a). Although FIG. 6 illustrates a configuration for a first side edge (104a), an identical or a mirrored arrangement may be in place for the second side edge (104b).

Figure 3:
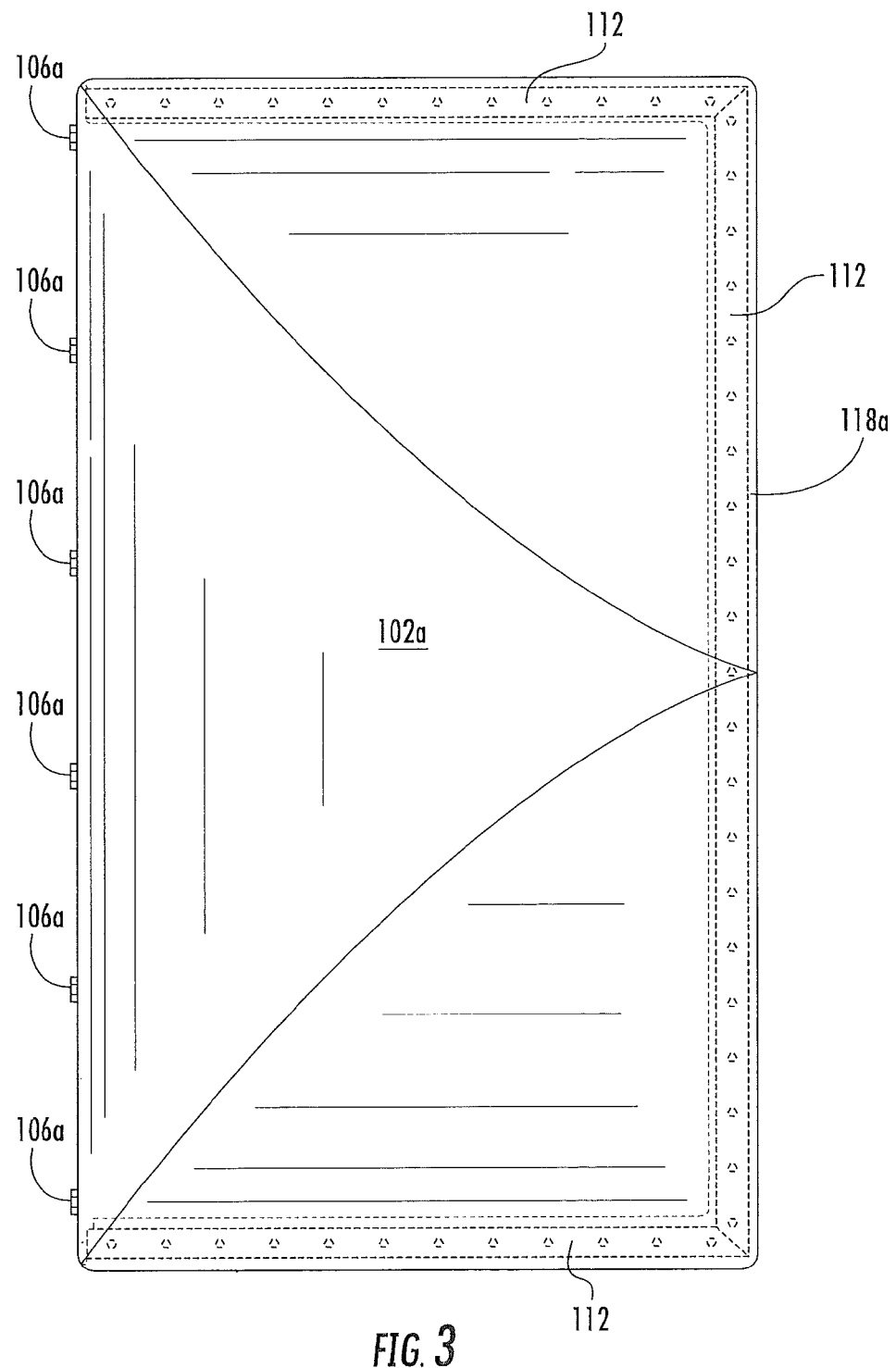
FIG. 3 illustrates a portion of a drag-reducing apparatus according to one embodiment described herein.
Figure 4:
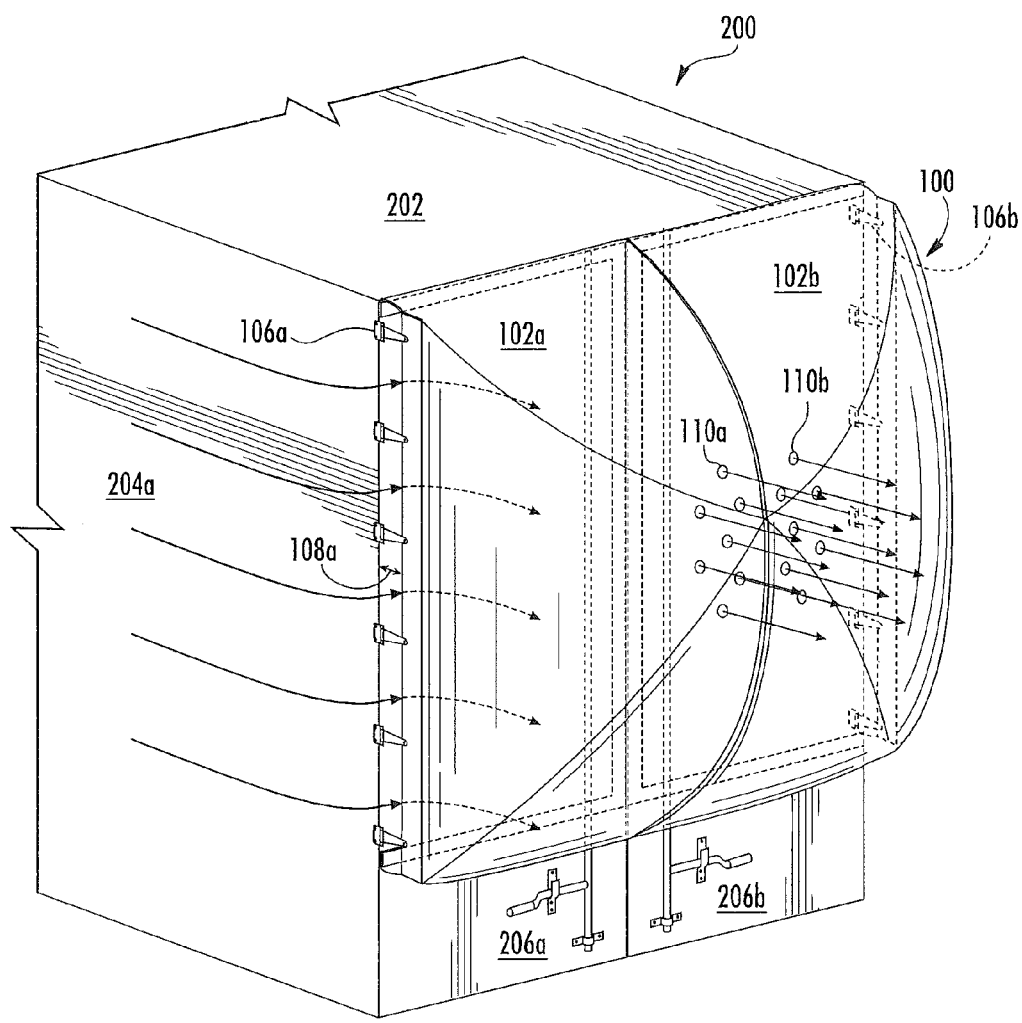
FIG. 4 illustrates a perspective view of a drag-reducing apparatus according to one embodiment described herein in use with a cargo container.
Figure 5:
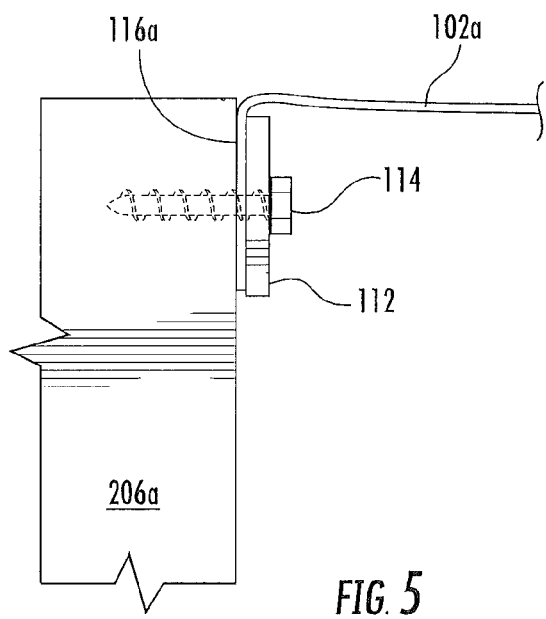
FIG. 5 illustrates a sectional view of components of a drag-reducing apparatus according to one embodiment described herein.

As illustrated in FIGS. 1-4, 6, 8, and 9A, a drag-reducing apparatus (100) consistent with some embodiments described herein further comprises a plurality of first fasteners (106a) adapted to join the first edge (104a) of the first flexible airfoil (102a) to the first side surface (204a) adjacent the first hinge (208a) to define a first air inlet (108a) between the first flexible airfoil (102a) and the first side surface (204a). Similarly, the drag-reducing apparatus (100) can comprise a plurality of second fasteners (106b) adapted to join the second edge (104b) of the second flexible airfoil (102b) to the second side surface (204b) adjacent the second hinge (208b) to define a second air inlet (108b) between the second flexible airfoil (102b) and the second side surface (204b). Fasteners can have any size or shape and can comprise or be formed from any materials not inconsistent with the present invention. One embodiment of such fasteners is shown in FIG. 6. In FIG. 6, the first fastener (106a) is attached to the first side surface (204a) of the cargo container (200) and is attached to the first side edge (104a) of the first flexible airfoil (102a) with a pin, bolt, clasp or screw (105). In the embodiment of FIG. 5, a spring (107a) is also attached to the first fastener (106a). The first fastener (106a) of FIG. 6 is pivotable, and the spring (107a) biases the fastener in an extended position such that the first flexible airfoil (102a) remains in an extended position during use. Other configurations, such as those without a spring-bias, are also possible. In some embodiments, second fasteners are identical to or are a mirror image of first fasteners.

An air inlet defined by flexible airfoils, fasteners, and portions of the cargo container can have any dimensions not inconsistent with the present invention operable to provide the utility discussed herein, in which air inlet inflates the flexible airfoil. For example, a first air inlet (108a) or a second air inlet (108b) can be between 3 and 18 inches wide, such as between 6 and 18 inches, between 9 and 18 inches, or between 12 and 18 inches. Further, in some embodiments, a first or second air inlet (108a, 108b) can have a width between 3 and 15 inches, between 3 and 12 inches, or between 3 and 9 inches. Other widths are also possible to enable functionality described herein. FIGS. 1 and 4 illustrate the utility first and second air inlets. As the cargo container (200) is moved in a direction away from the first rear door (206a) and second rear door (206b), air flow along the first side surface (204a) enters into the first air inlet (108a), and air flow along the second side surface (204b) enters into the second air inlet (108b). This air flow inflates the first and/or second flexible airfoils (102a, 102b) into a deployed position, with the first flexible airfoil (102a) being in a first deployed position, and the second flexible airfoil (102b) being in a second deployed position.

Opposite the first air inlet (108a) on the first flexible airfoil is a first interior edge (118a) and opposite the second air inlet on the second flexible airfoil is a second interior edge (118b). The interior edges do not define air gaps or air inlets. In this manner, air taken in through the first and second air inlets (108a, 108b) is retained within the flexible airfoils (102a, 102b) while permitting the doors to be opened or closed separately from one another. One embodiment of such an arrangement is illustrated in FIG. 3, however it is to be understood that any configuration or components can be used to enable such functionality. In FIG. 3, as in FIG. 5 with the first top edge (116a, discussed below), the interior edge (118a) is folded under a retaining bar (112) and bolted, pinned, or screwed into the first rear door (206a) along a perimeter of the first rear door (206a).

Figure 7:
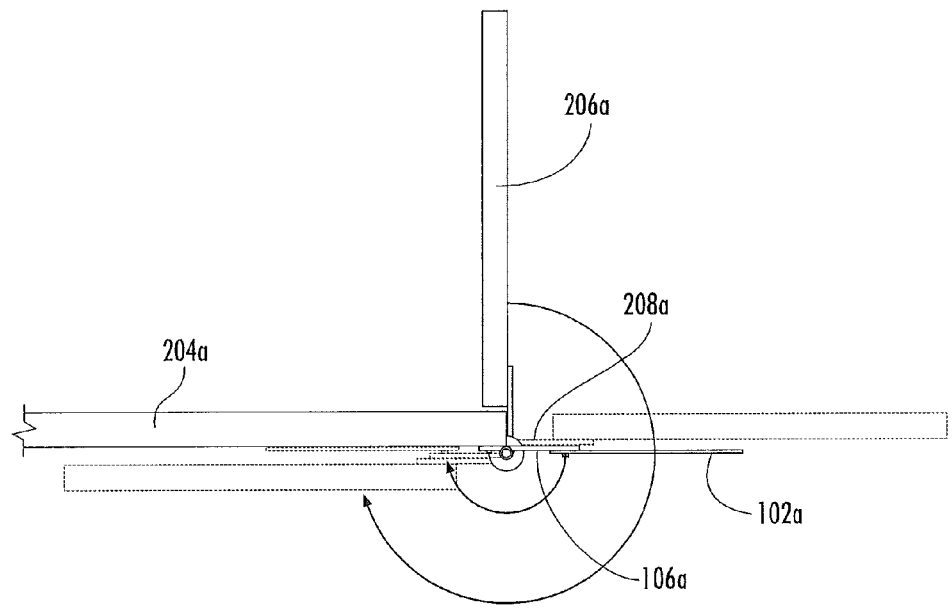
FIG. 7 illustrates a sectional view of components of a drag-reducing apparatus according to one embodiment described herein.
Figure 8:
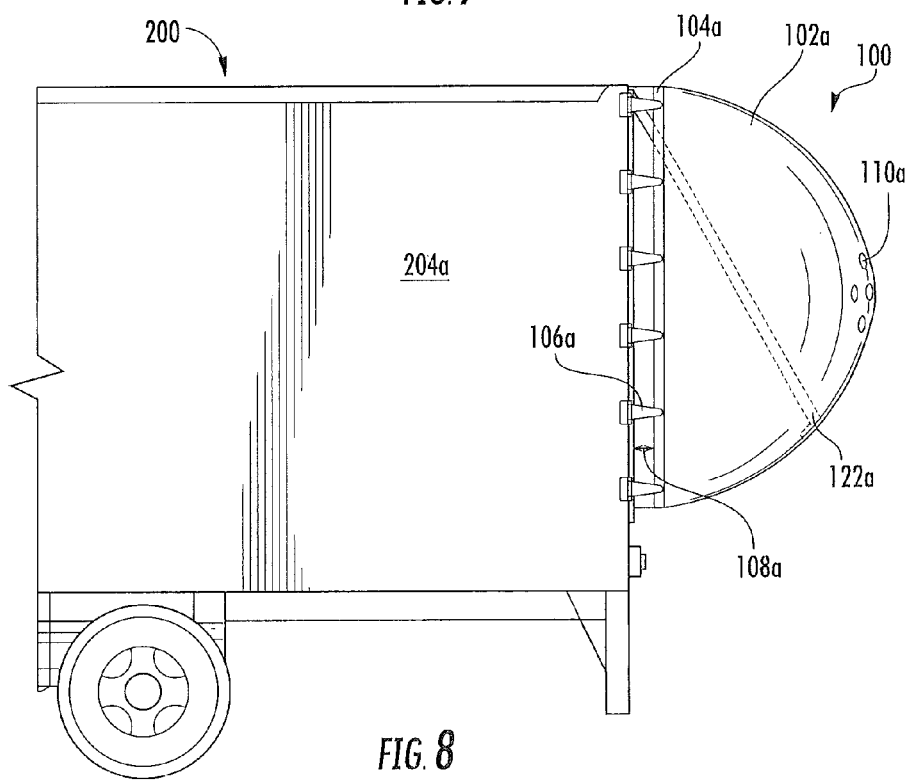
FIG. 8 illustrates a side view of a drag-reducing apparatus according to one embodiment described herein in use with a cargo container.

A first flexible airfoil (102a) and a second flexible airfoil (102b) can be shaped or sized such that when the first flexible airfoil (102a) is inflated into a first deployed position and the second flexible airfoil (102b) is inflated into a second deployed position, a net shape of the first and second flexible airfoils (102a, 102b) is a single or unitary airfoil shape. FIGS. 1, 2, 4, 8 and 9A illustrate one embodiment of such an embodiment. Each of the flexible airfoils can define a rounded exterior shape with at least one planar or substantially planar surface intended to abut a corresponding surface on an adjacent airfoil. In such a configuration, individual airfoils can be separately attached onto or near separate rear doors. This allows an operator to open and close rear doors while still providing reduction in drag when the cargo container is in motion. Thus, in some embodiments, first fasteners (106a) pivotally join the first side edge (104a) of the first flexible airfoil (102a) to the first side surface (204a) of the cargo container (200). Similarly, second fasteners (106b) can pivotally join the second side edge (104b) of the second flexible airfoil (102b) to the second side surface (204b) of the cargo container (200). FIG. 7 illustrates a top view of one such embodiment. In the embodiment of FIG. 7, the first rear door (206a) can be pivoted on a first hinge (208a) up to and including approximately 270 degrees from an initial position perpendicular to the first side surface (204a) to parallel or substantially parallel with the first side surface (204a). The first flexible airfoil (102a, shown schematically) can be pivoted on first fasteners (106a) up to 180 degrees. Such an embodiment permits full use of the rear doors of the cargo container while permitting use of the flexible airfoil when the cargo container is moved, such as on a commercial transport vehicle.

In some embodiments, as illustrated in FIG. 5, a first flexible airfoil (102a) defines a first top edge (116a) and/or a second flexible airfoil (102b) defines a second top edge (116b). The first top edge (116a) of the first flexible airfoil (102a) is joined to at least one of the first rear door (204a) and the top surface (202) of the cargo container to permit air flow along the top surface (202) across the first flexible airfoil (102a). Similarly, the second top edge (116b) of the second flexible airfoil (102b) is joined to at least one of the second rear door (204b) and the top surface (202) of the cargo container to permit air flow along the top surface (202) across the second flexible airfoil (102b). In contrast to the air inlets defined along the side surface, air flow across the top surface of the cargo container is not disrupted in order to retain increased drag-resistance while still enabling the inflatable utility of the apparatus. FIG. 5 illustrates one embodiment in which the first top edge (116b) is attached to the first rear door (204a). This is achieved by folding the first top edge (116b), placing a bracket or retaining bar (112) over the first top edge (116b), and securing a bolt, screw, or pin in the retaining bar (112) and the first rear door (204). The folded arrangement provides a substantially continuous plane extending from the top surface of the cargo container to maintain air flow along the top surface and across the flexible airfoil. Stated otherwise, the first and/or second top edges can be joined to at least one of a rear door and the top surface of the cargo container without an air gap between the first or second top edge and the top surface. The same arrangement can be incorporated for the second flexible airfoil.

In some embodiments, apparatus described herein can have one or more features that enhance or further enable drag-reduction capabilities. For example, in some embodiments, the first flexible airfoil (102a) defines a first apex opposite the first rear door (206a) and the second flexible airfoil (102b) defines a second apex opposite the second rear door (206b). In such embodiments, the flexible airfoils are rounded or curved, such as in a parabolic shape, and an apex is defined generally as a point or region furthest away from the first and/or second rear doors. In such embodiments, as shown in FIGS. 4, 8, 9A, and 9B, the first flexible airfoil (102a) defines a plurality of first holes (110a) proximate the first apex and the second flexible airfoil (102b) defines a plurality of second holes (110b) proximate the second apex. These holes (110a, 110b) can permit air to exit the flexible airfoils (102a, 102b). This escaping or exiting air can minimize or eliminate drag-increasing wind vortices which may otherwise accumulate behind the airfoils during transit.

In some embodiments, as illustrated in FIG. 4, the first and/or second flexible airfoils (102a, 102b) extend partially along a length of the first and/or second rear doors (206a, 206b). In this configuration, an operator can access handles or latches unimpeded by the drag-reducing apparatus. In order to supplement this functionality, some embodiments of an apparatus described herein comprise at least one first support strap (122a) having a first end and a second end, the first end being joined to an interior of the first flexible airfoil (102a) and the second end being adapted to be joined to at least one of the first rear door (206a) and the top surface (202) of the cargo container (200). Similarly, an apparatus can comprise at least one second support strap (122b) having a first end and a second end, the first end being joined to an interior of the second flexible airfoil (102b) and the second end being adapted to be joined to at least one of the second rear door (206b) and the top surface (202) of the cargo container. In such embodiments, the first and/or second support straps (122a, 122b) can limit the range of motion of a de-deployed or deflated airfoil. In embodiments in which the cargo container (200) is attached to a commercial transport vehicle, an unsupported flexible airfoil may cover or impede access to a door latch, or may cover a tail light of the vehicle at a traffic stop. Thus, limiting the downward range of motion of the deflated airfoil may serve more than one function in improving the utility of the apparatus.

Figure 9A:
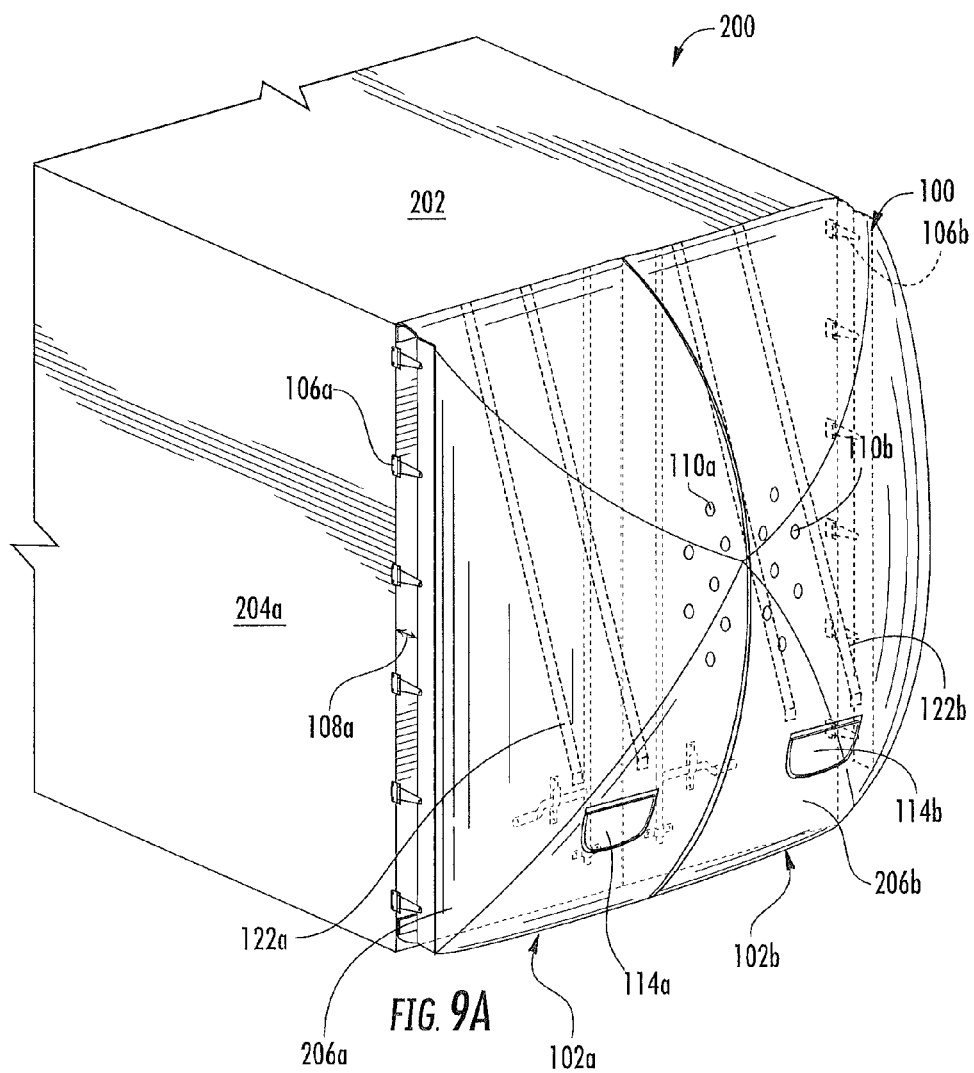
FIG. 9A illustrates a perspective view of a drag-reducing apparatus according to one embodiment described herein in use with a cargo container.
Figure 9B:
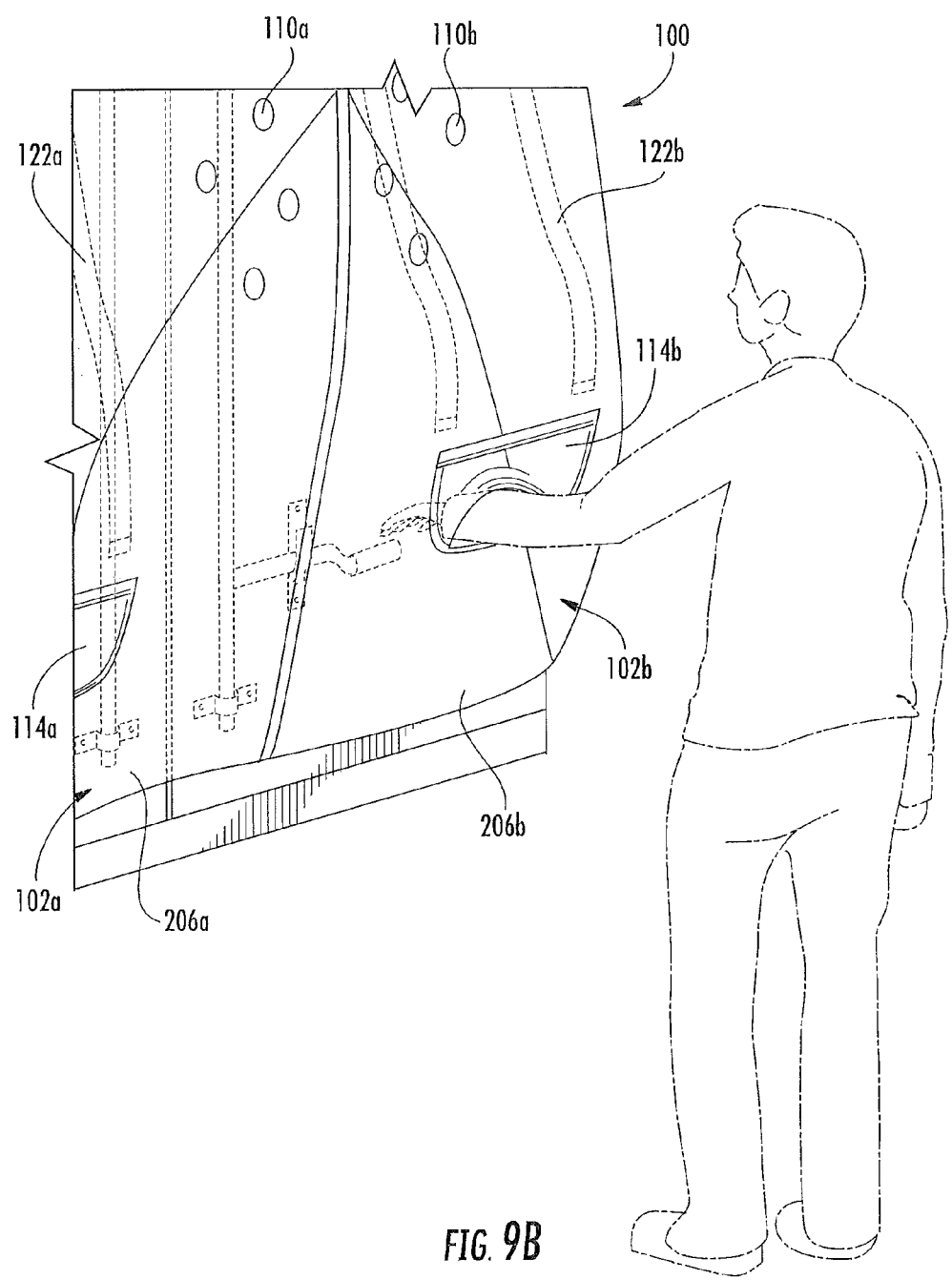
FIG. 9B illustrates a section of a perspective view of a drag-reducing apparatus according to one embodiment described herein in use with a cargo container.

In certain other embodiments, the first and/or second flexible airfoils (102a, 102b) cover all or substantially all of the surface area of a first rear door and/or a second rear door (206a, 206b). In such embodiments support straps (122a, 122b) can be used. Additionally and/or alternatively, one or more reach-through passages (114a, 114b) can be used, with a first reach-through passage (114a) being disposed on or within or defined by a first flexible airfoil (102a), and a second reach-through passage (114b) being disposed on or within or defined by a second flexible airfoil (102b). Such passages can be defined as a gap in an airfoil covered or substantially covered by a movable flap. FIG. 9B illustrates the utility of such an embodiment to user seeking to gain access to a door latch or door handle.

II. Drag-Reducing Apparatus for Cargo Containers Having a Single Rear Door

In a second aspect, drag-reducing apparatus are described herein for cargo containers having a single rear door, such as a rear overhead roll up door. As illustrated in FIGS. 10-16, the cargo container (400) defines a top surface (402), a rear surface (406) a first side surface (404a) having an intersection with the rear surface (406), and a second side surface (404b) having an intersection with the rear surface (406). The drag-reducing apparatus, in some embodiments, comprises a first vertical guide member (302a), a second vertical guide member (302b), a flexible airfoil (304), and a plurality of fasteners (310). The first vertical guide member (302a) is joined to the cargo container (400) adjacent an intersection between the first side surface (404a) and the rear surface (406). The second vertical guide member (302b) is joined to the cargo container (400) adjacent an intersection between the second side surface (404b) and the rear surface (406). The flexible airfoil (304) defines a top edge (306), a first side edge (308a), and a second side edge (308b). The plurality of fasteners (310) slidably join the first side edge (308a) of the flexible airfoil (304) to the first vertical guide member (302a) and the second side edge (308b) of the flexible airfoil (304) to the second vertical guide member (302b). The flexible airfoil (304), the first side surface (404a), and the fasteners (310) together define a first air inlet (312a) between the first side surface (404a) of the cargo container (400) and the first side edge (308a) of the flexible airfoil (304). The flexible airfoil (304), the second side surface (404b), and the fasteners (308) together define a second air inlet (312b) between the second side surface (404b) of the cargo container (400) and the second side edge (308b) of the flexible airfoil (304). At least one of the first air inlet and second air inlet (312a, 312b) permits air flow along the first and second side surfaces (404a, 404b) into the flexible airfoil (304) to inflate the flexible airfoil (304) into a deployed position when the cargo container (400) is moved in a direction away from the rear surface (406).

Turning now to specific components and with reference to FIGS. 10-16, drag-reducing apparatus described herein comprise a flexible airfoil (304). A flexible airfoil (304) can comprise or include any materials consistent with the disclosure in Section I of first and second flexible airfoils. A flexible airfoil can have any shape or dimensions operable to reduce drag on a cargo container consistent with the present invention.

Further, apparatus described herein can comprise a first vertical guide member (302a) joined to the cargo container (200) adjacent an intersection between the first side surface (404a) and the rear surface (408). Apparatus further comprise a second vertical guide member (302b) joined to the cargo container adjacent an intersection between the second side surface (404b) and the rear surface (408). First and/or second vertical guide members (302a, 302b) can comprise or be formed of any material consistent with the present invention. For example, in some embodiments, vertical guide members are rods or other rigid structures and can comprise or be formed from a metal or metal alloy, a fiber-reinforced material such as a carbon-fiber resin, or a hard plastic. In certain other embodiments, vertical guide members comprise or include tensioned cables or fiber structures.

Figure 11:
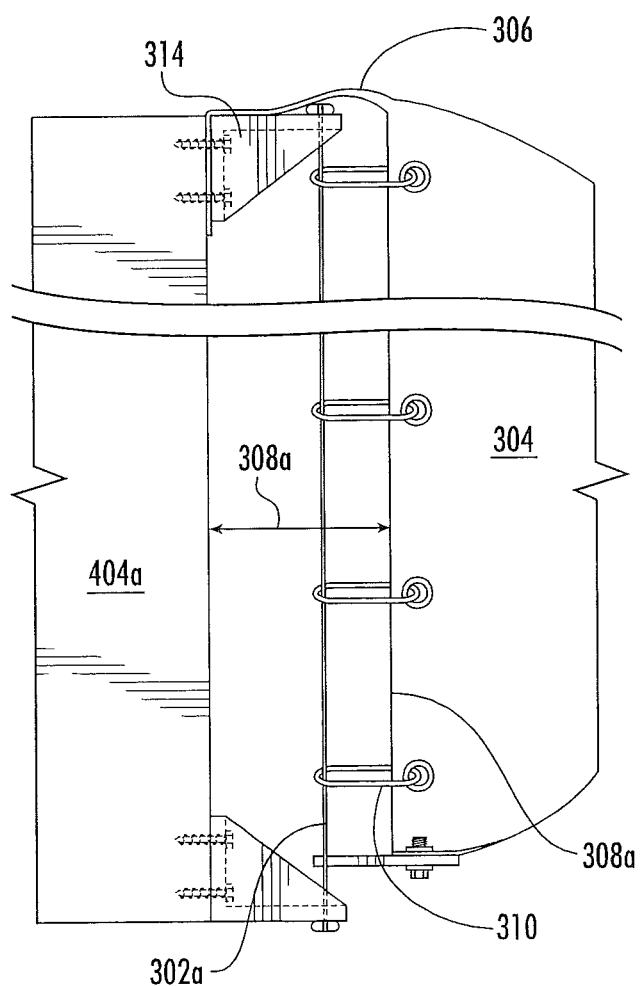
FIG. 11 illustrates a sectional view of components of a drag-reducing apparatus according to one embodiment described herein.

In some embodiments, apparatus further comprise a plurality of fasteners (310) slidably joining the first side edge (308a) of the flexible airfoil (304) to the first vertical guide member (302a) and the second side edge (308b) of the flexible airfoil (304) to the second vertical guide member (302b). FIG. 11 illustrates one embodiment of fasteners adapted for such a purpose. Fasteners (310) can have any shape, form or dimensions not inconsistent with the present invention, and can be formed from any material not inconsistent with the present invention. However, in the embodiment of FIG. 11, the fasteners (310) are loop-shaped. This shape permits functionality similar to a curtain rod, in which the looped fasteners (310) can slide vertically along the vertical guide member (302a). In some embodiments, the first side edges (308a) and the second side edges (308b) comprise a plurality of grommets as seen in FIG. 13, and the fasteners (310) are joined to the edges at the grommets. With fasteners configured in this manner, the flexible airfoil (304) can be moved between a lowered or deployed position as in FIG. 12, or in a raised or undeployed/de-deployed position as in FIG. 15. In the lowered or deployed positions, the flexible airfoil (304), the first side surface (404a), and the fasteners (310) together define a first air inlet (312a) between the first side surface (404a) and the first side edge (308a) of the flexible airfoil (304). Similarly, in the lowered or deployed positions, the flexible airfoil (304), the second side surface (404b), and the fasteners (310) together define a second air inlet (312b) between the second side surface (404b) and the second side edge (308b) of the flexible airfoil (304). This permits air intake and inflation/deployment of the airfoil similar to the functionality described in Section I above for the first and second flexible airfoils.

Figure 10:
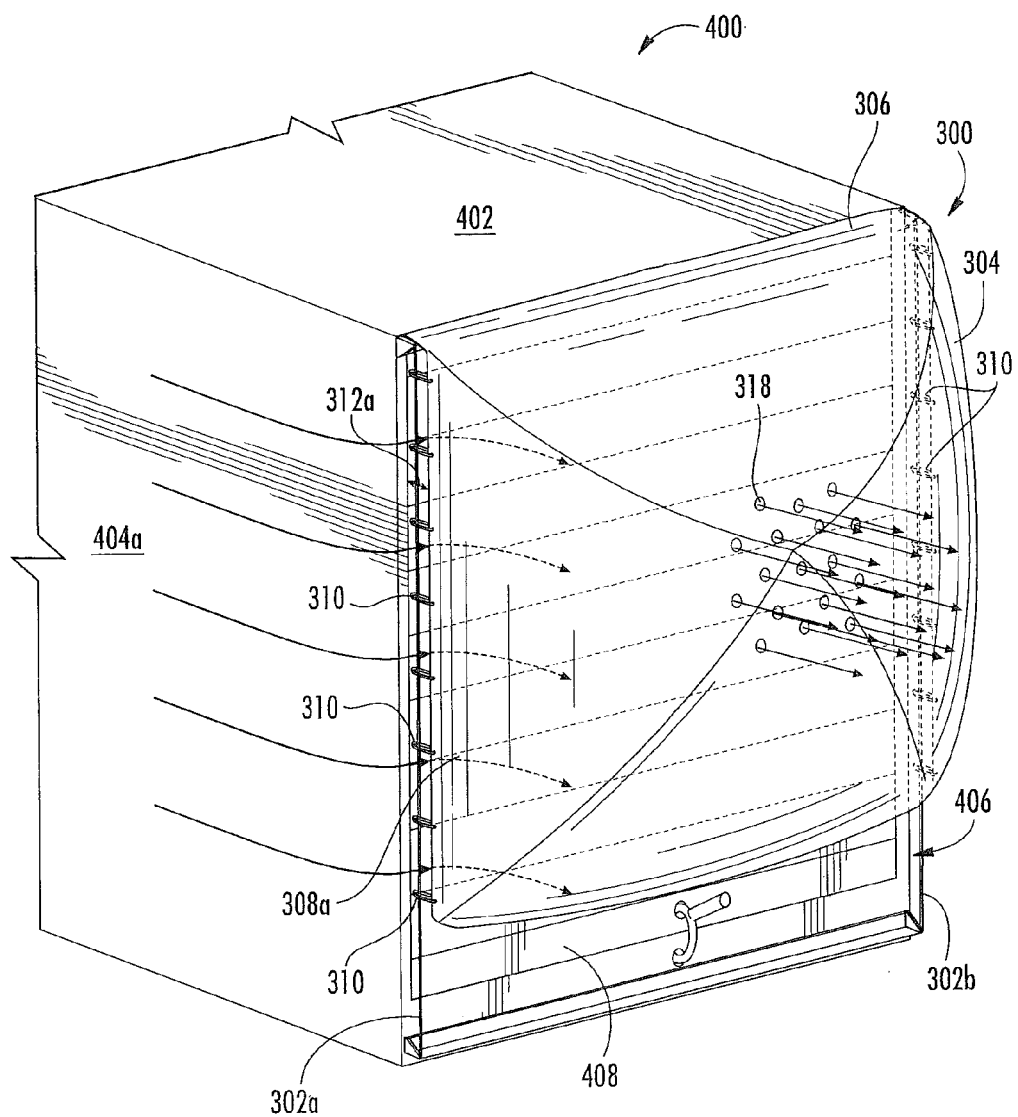
FIG. 10 illustrates a perspective view of a drag-reducing apparatus according to one embodiment described herein in use with a cargo container.

Similar to the above discussion in Section I of first and second flexible airfoils, the flexible airfoil of the present aspect, as illustrated in FIG. 10, can define an apex opposite the rear surface (406) of the cargo container (400), and the flexible airfoil (304) can define a plurality of holes (318) proximate the apex to permit air to exit or escape the flexible airfoil (304) to break up vortices produced during movement or transit of the cargo container, thus reducing drag caused by such vortices. In a further drag-minimizing configuration, as seen in FIG. 11, a top edge (306) of the flexible airfoil (304) can be joined to one of the rear surface (406) and the top surface (402) of the cargo container (400) to permit air flow along the top surface (402) and across the flexible air foil (304). For example, the top edge (306) can be joined to at least one of the rear surface (406) and the top surface (402) of the cargo container (400) without an air gap between the top edge (306) and the top surface (402). This may be achieved as illustrated in FIG. 11, by folding the top edge (306) of the flexible airfoil (304) and attaching the top edge (306) to the cargo container (400) by an edge-joining member (314).

Figure 12:
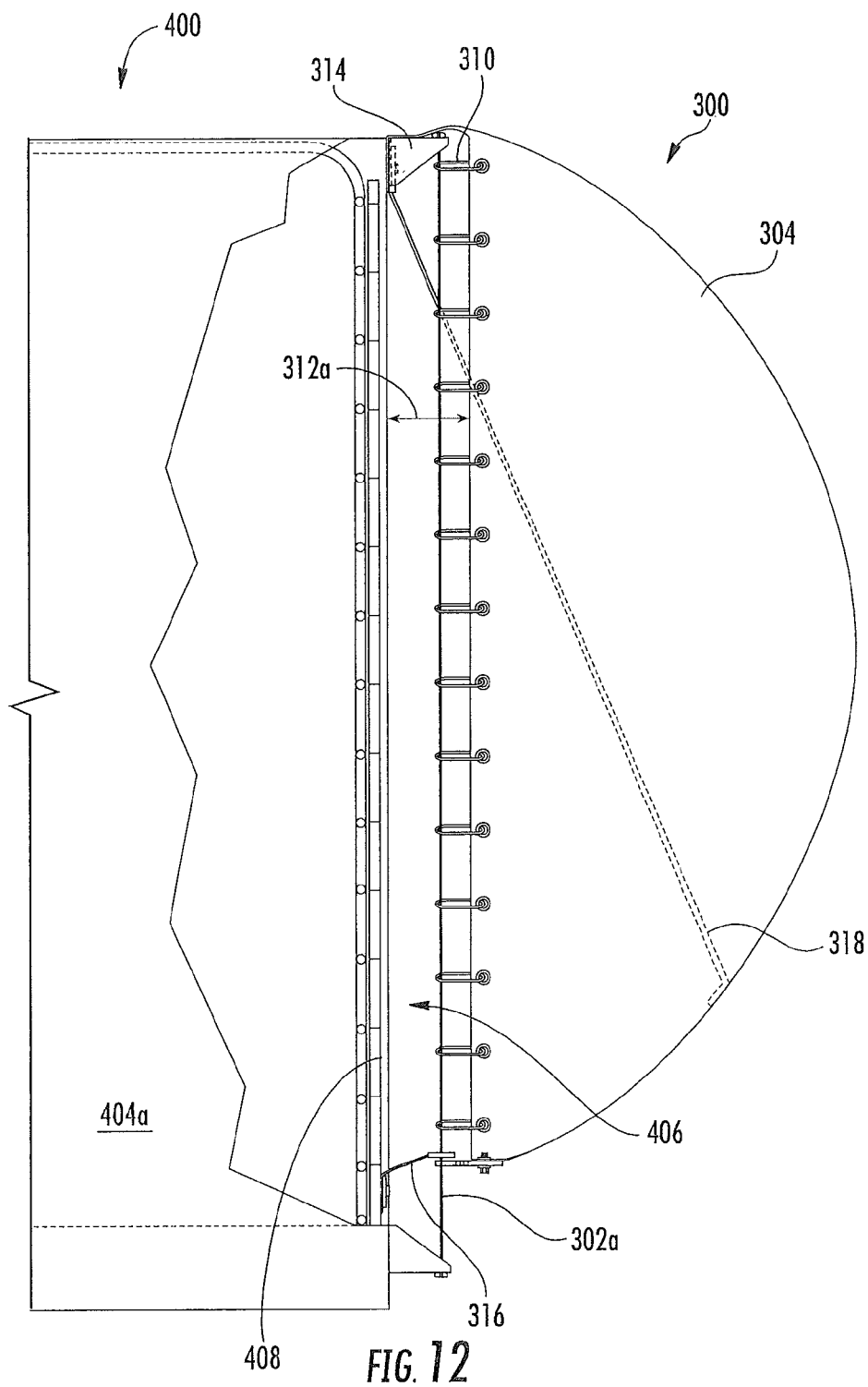
FIG. 12 illustrates a side view and semi-cross-sectional view of a drag-reducing apparatus according to one embodiment described herein in use with a cargo container.
Figure 13:
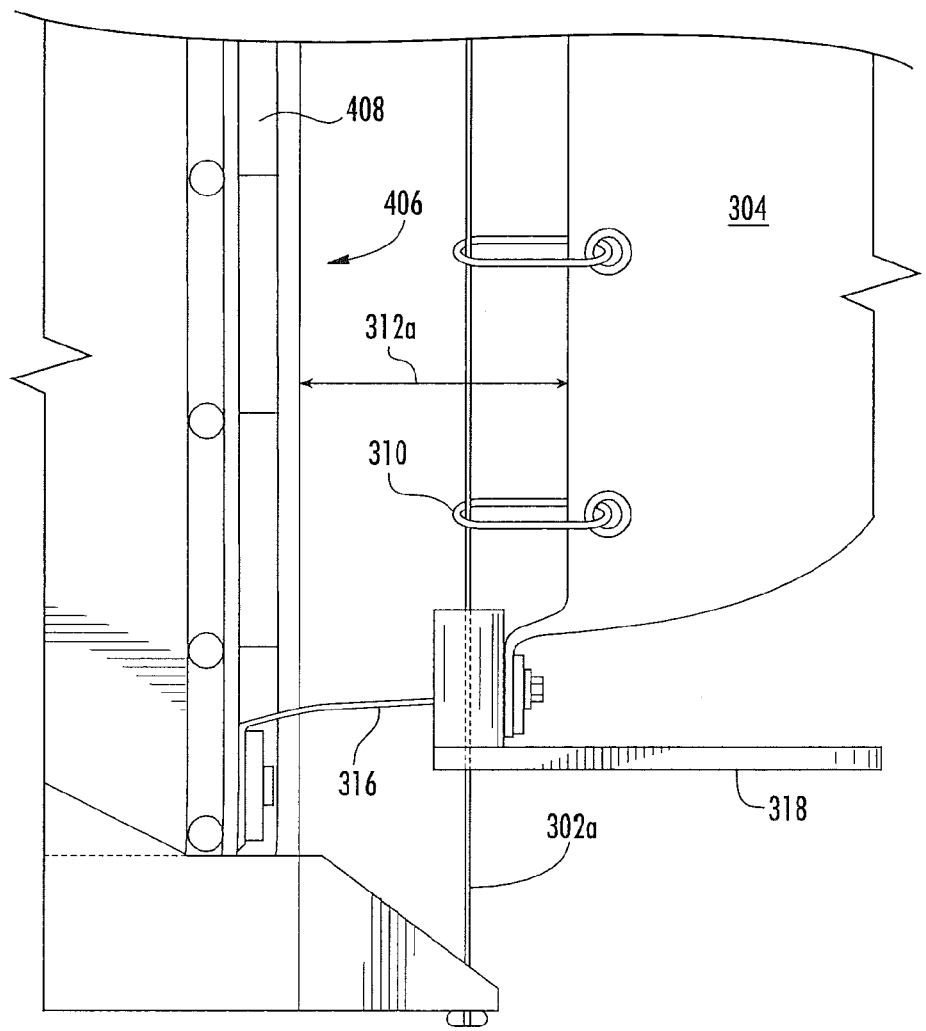
FIG. 13 illustrates a sectional view of components of a drag-reducing apparatus according to one embodiment described herein.
Figure 14:
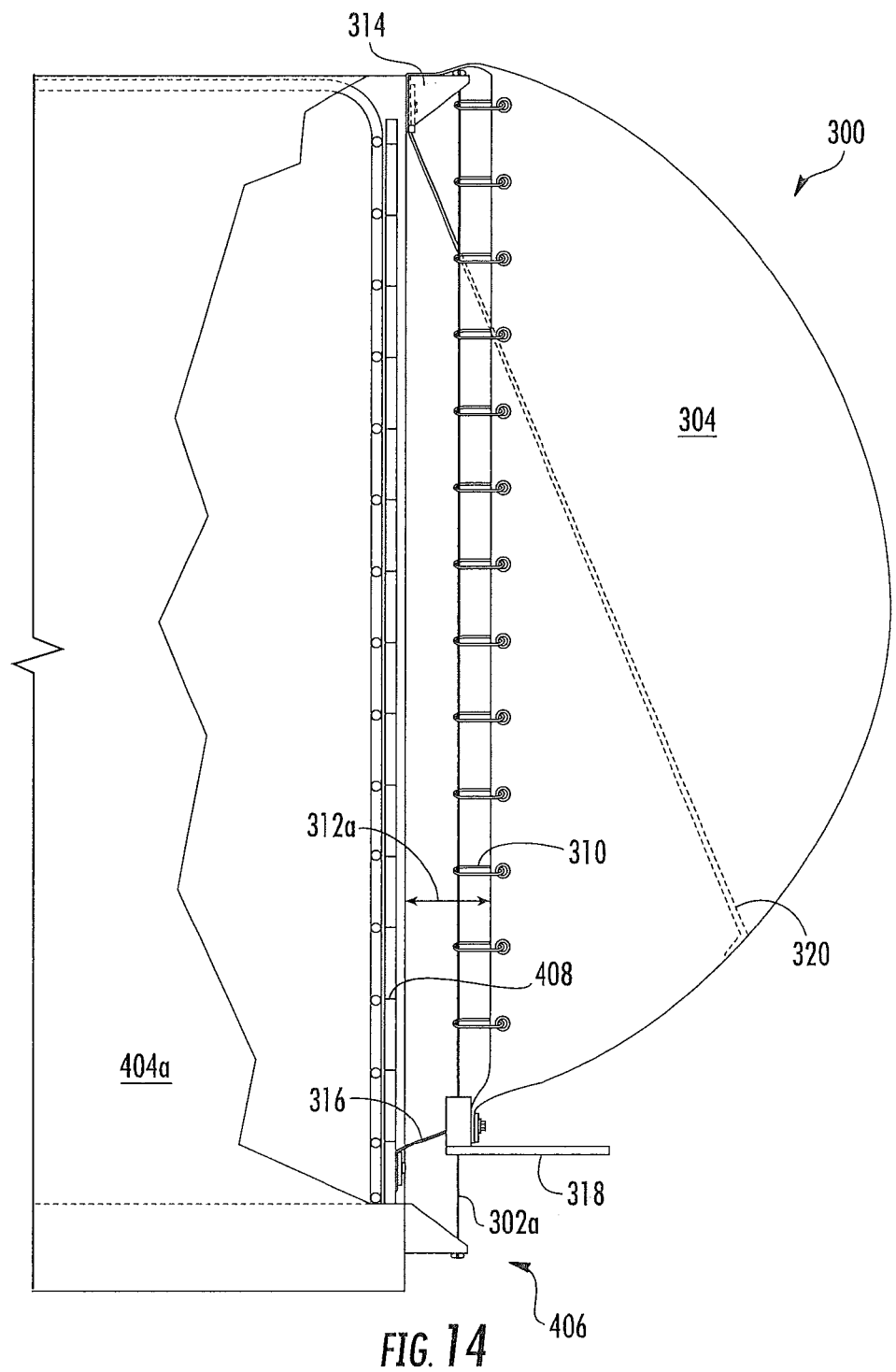
FIG. 14 illustrates a side view and semi-cross-sectional view of a drag-reducing apparatus according to one embodiment described herein in use with a cargo container.
Figure 15:
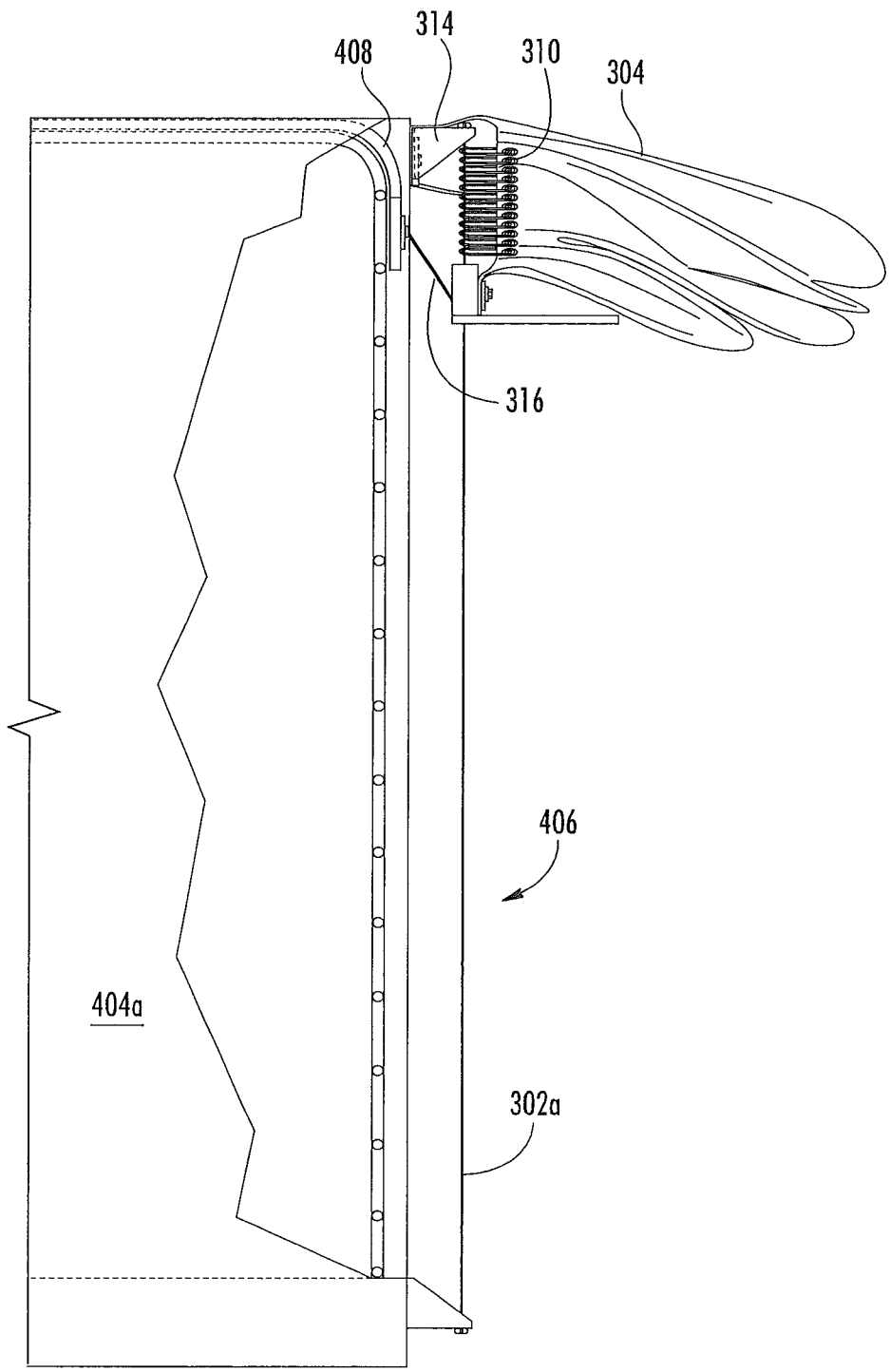
FIG. 15 illustrates a side view and semi-cross-sectional view of a drag-reducing apparatus according to one embodiment described herein in use with a cargo container.
Figure 16:
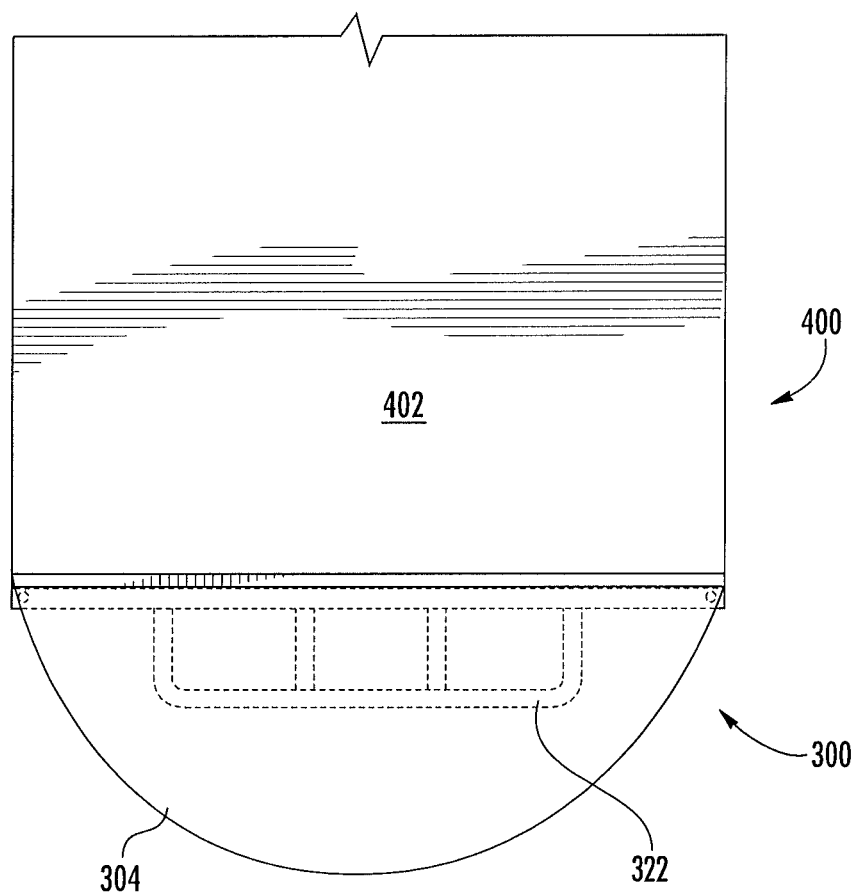
FIG. 16 illustrates a top view of a drag-reducing apparatus according to one embodiment described herein in use with a cargo container.

In some embodiments, an apparatus consistent with the present aspect is usable with a cargo container having an overhead roll up door as illustrated in FIG. 12. In such embodiments, the drag-reducing apparatus (300) further comprises a first bracket (316) slidably joined to the first vertical guide member (302a) and adapted to be joined to the overhead roll up door. The apparatus (300) can further comprise a second bracket (not shown) slidably joined to the second vertical guide member (302b) and adapted to be joined to the overhead roll up door. The first bracket (316) and the second bracket join the guide members such that opening the overhead roll up door raises the flexible airfoil (304) into a stored position, as in FIG. 15, and closing the overhead roll up door lowers the flexible airfoil into a ready-for-use or lowered position, as in FIG. 12. FIG. 13 further illustrates that an apparatus can comprise or include an airfoil shelf (322) configured to gather the flexible airfoil (304) when the flexible airfoil is raised into the stored position. A top view of the airfoil shelf is shown in FIG. 16. Configurations consistent with such embodiments enable a user to access the cargo compartment without separate movement of the flexible apparatus, thus expediting loading operations while permitting the drag-reduction utility when the cargo container is in transit. Similar to the discussion in Section I, an apparatus (300) consistent with the present aspect of the invention can comprise or include at least one support strap (320) having a first end joined to an interior of the flexible airfoil (304) and a second end joined to at least one of the rear surface (406) and the top surface (402) of the cargo container.

Various implementations of apparatus and methods have been described in fulfillment of the various objectives of the present disclosure. It should be recognized that these implementations are merely illustrative of the principles of the present disclosure. Numerous modifications and adaptations thereof will be readily apparent to those skilled in the art without departing from the spirit and scope of the present disclosure. For example, individual steps of methods described herein can be carried out in any manner and/or in any order not inconsistent with the objectives of the present disclosure, and various configurations or adaptations of apparatus described herein may be used.

That which is claimed is:

1. A drag-reducing apparatus for a cargo container, the cargo container defining a top surface, a first side surface having a first rear door attached thereto by at least one first hinge, and a second side surface having a second rear door attached thereto by at least one second hinge, the apparatus comprising:
    a first flexible airfoil comprising a first side edge and one or more first exit holes;
    a plurality of first fasteners adapted to join the first side edge of the first flexible airfoil to the first side surface adjacent the first hinge to define a first air inlet between the first flexible airfoil and the first side surface;
    a second flexible airfoil comprising a second side edge and one or more second exit holes; and
    a plurality of second fasteners adapted to join the second side edge of the second flexible airfoil to the second side surface adjacent the second hinge to define a second air inlet between the second flexible airfoil and the second side surface,
    wherein the first air inlet permits air flow along the first side surface into the first flexible airfoil to inflate the first airfoil into a first deployed position and the first exit holes permit the air received from the first air inlet to exit the first airfoil when the cargo container is moved in a direction away from the first flexible airfoil; and
    wherein the second air inlet permits air flow along the second side surface into the second flexible airfoil to inflate the second airfoil into a second deployed position and the second exit holes permit the air received from the second air inlet to exit the second airfoil when the cargo container is moved in a direction away from the second flexible airfoil.

2. The drag-reducing apparatus of claim 1, wherein the first fasteners pivotally join the first side edge of the first flexible airfoil to the first side surface of the cargo container.

3. The drag-reducing apparatus of claim 1, wherein the second fasteners pivotally join the second side edge of the second flexible airfoil to the second side surface of the cargo container.

4. The drag-reducing apparatus of claim 1, wherein:
    the first flexible airfoil defines a first top edge; and
    the first top edge of the first flexible airfoil is joined to at least one of the first rear door of the cargo container and the top surface of the cargo to permit air flow along the top surface across the first flexible airfoil.

5. The drag-reducing apparatus of claim 4, wherein the first top edge is joined to at least one of the first rear door and the top surface of the cargo unit without an air gap between the first top edge and the top surface.

6. The drag-reducing apparatus of claim 1, wherein:
    the second flexible airfoil defines a second top edge; and
    the top edge of the second flexible airfoil is joined to at least one of the second rear door of the cargo container or the top surface of the cargo to permit air flow along the top surface across the second flexible airfoil.

7. The drag-reducing apparatus of claim 6, wherein the second top edge is joined to at least one of the second rear door and the top surface of the cargo unit without an air gap between the second top edge and the top surface.

8. The drag-reducing apparatus of claim 1, wherein:
    the first flexible airfoil defines a first apex opposite the first rear door;
    the second flexible airfoil defines a second apex opposite the second rear door;
    the one or more first exit holes being disposed proximate the first apex; and
    the one or more second exit holes being disposed proximate the second apex.

9. The drag-reducing apparatus of claim 1 further comprising:
    a first metallic edge member joined to the first side edge of the first flexible airfoil, the first metallic edge member being joined to the first side edge by a plurality of first bolts or pins; and
    a second metallic edge member joined to the second side edge of the second flexible airfoil, the second metallic edge member being joined to the second side edge by a plurality of second bolts or pins.

10. The drag-reducing apparatus of claim 1 further comprising:
at least one first support strap having a first end and a second end, the first end being joined to an interior of the first flexible airfoil and the second end being adapted to be joined to at least one of the first rear door and the top surface of the cargo container; and
at least one second support strap having a first end and a second end, the first end being joined to an interior of the second flexible airfoil and the second end being adapted to be joined to at least one of the second rear door and the top surface of the cargo container.

11. The drag-reducing apparatus of claim 1, wherein:
the first flexible airfoil defines a first reach-through passage, the first reach-through passage being defined as a first gap in the first flexible airfoil substantially covered by a movable first flap; and
the second flexible airfoil defines a second reach-through passage, the second reach-through passage being defined as a second gap in the second flexible airfoil substantially covered by a movable second flap.

12. A drag-reducing apparatus for a cargo container, the cargo container defining a top surface, a rear surface, a first side surface having an intersection with the rear surface, and a second side surface having an intersection with the rear surface, the apparatus comprising:
a first vertical guide member joined to the cargo container adjacent an intersection between the first side surface and the rear surface;
a second vertical guide member joined to the cargo container adjacent an intersection between the second side surface and the rear surface;
a flexible airfoil defining a top edge, a first side edge, and a second side edge; and
a plurality of fasteners slidably joining the first side edge of the flexible airfoil to the first vertical guide member and the second side edge of the flexible airfoil to the second vertical guide member,
wherein the flexible airfoil, the first side surface, and the fasteners together define a first air inlet between the first side surface of the cargo container and the first side edge of the flexible airfoil;
wherein the flexible airfoil, the second side surface, and the fasteners together define a second air inlet between the second side surface of the cargo container and the second side edge of the flexible airfoil; and
wherein at least one of the first air inlet and second air inlet permits air flow along the first side surface and/or second side surface, respectively, into the flexible airfoil to inflate the flexible airfoil into a deployed position when the cargo container is moved in a direction away from the rear surface.

13. The drag-reducing apparatus of claim 12, wherein:
the flexible airfoil defines an apex opposite the rear surface of the cargo container; and
the flexible airfoil defines a plurality of holes proximate the apex.

14. The drag-reducing apparatus of claim 12, wherein the top edge of the flexible airfoil is joined to one of the rear surface and the top surface of the cargo container to permit air flow along the top surface and across the flexible air foil.

15. The drag-reducing apparatus of claim 14, wherein the top edge is joined to at least one of the rear surface and the top surface of the cargo unit without an air gap between the top edge and the top surface.

16. The drag-reducing apparatus of claim 12 wherein:
the rear surface of the cargo container comprises an overhead roll up door;
the drag-reducing apparatus further comprises a first bracket slidably joined to the first vertical guide member and adapted to be joined to the overhead roll up door, and a second bracket slidably joined to the second vertical guide member and adapted to be joined to the overhead roll up door; and
the first bracket and the second bracket join the guide members such that opening the overhead roll up door raises the flexible airfoil into a stored position and closing the overhead roll up door lowers the flexible airfoil into a ready-for-use position.

17. The drag-reducing apparatus of claim 16 further comprising an airfoil shelf configured to gather the flexible airfoil when the flexible airfoil is raised into the stored position.

18. The drag-reducing apparatus of claim 12, wherein:
the first side edge and the second side edge of the flexible airfoil comprise a plurality of grommets; and
the fasteners are joined to the first side edge and the second side edge of the flexible airfoil at the grommets.

19. The drag-reducing apparatus of claim 12 further comprising at least one support strap having a first end joined to an interior of the flexible airfoil and a second end joined to at least one of the rear surface and the top surface of the cargo container.

* * * * *